D. FAIRBANKS.
Tire Setter and Fastener.
No. 217,599.        Patented July 15, 1879.
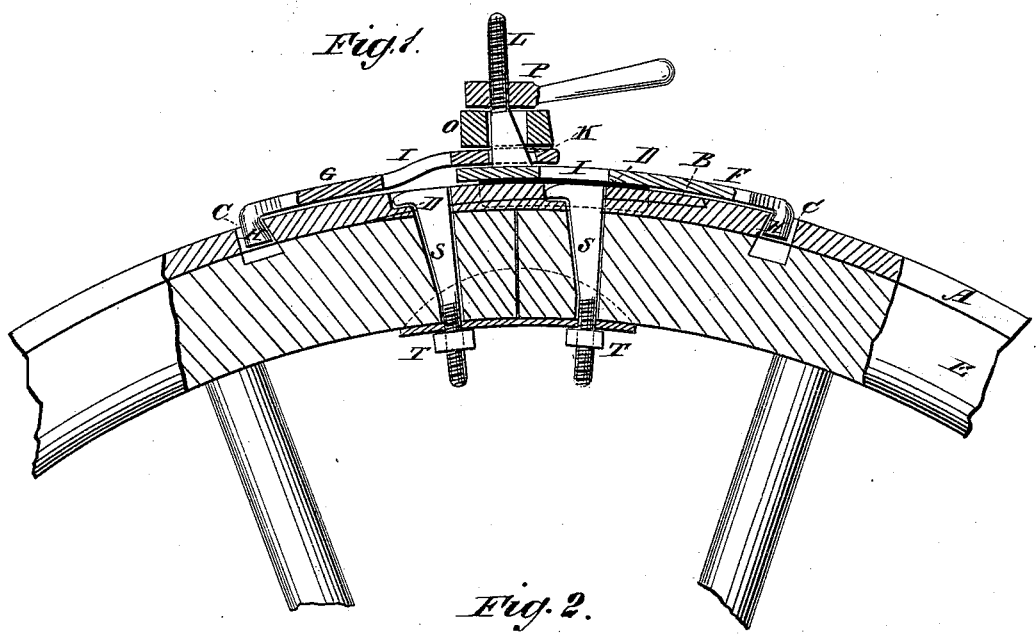
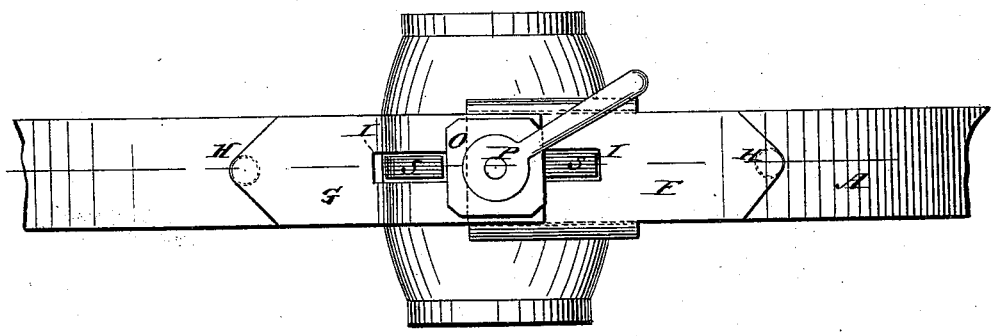
WITNESSES:
Francis McArdle.
C. Sedgwick
INVENTOR:
D. Fairbanks
BY Munn & Co
ATTORNEYS.

UNITED STATES PATENT OFFICE.

DAVID FAIRBANKS, OF ROCKINGHAM, VERMONT.

IMPROVEMENT IN TIRE SETTERS AND FASTENERS.

Specification forming part of Letters Patent No. 217,599, dated July 15, 1879; application filed December 16, 1878.

*To all whom it may concern:*

Be it known that I, DAVID FAIRBANKS, of Rockingham, in the county of Windham and State of Vermont, have invented a new and useful Improvement in Tire Setters and Fasteners, of which the following is a specification.

Figure 1 is a sectional elevation, showing the jointed tire and the apparatus for setting and fastening it to the rim of the wheel. Fig. 2 is a plan view of the same.

Similar letters of reference indicate corresponding parts.

I make the tire A lap-jointed, as shown at B, and having holes C C through it just beyond the extremities of the lap-joint, and slotted holes D D through both parts of the lap and also of the bolts S S.

E is a section of the wheel to which the tire is to be attached.

The invention further consists of a clamping or tightening apparatus composed of the parts F and G, having each a boss or projection at its lower extremity, as shown at H H, and each pierced with a slot, I I. The plate G has an additional slot, K, into which fits the screw-bolt L, which is attached to and is part of the under plate, F.

It is well known that a majority of blacksmiths cannot measure and weld a tire without making mistakes in its length of from, say, one-eighth to one-fourth of an inch, and that commonly they have to make several trials before succeeding in making a proper fit.

The object of this invention is to insure perfect accuracy, to fit and tighten the tire at little expense, and in a manner which shall preclude all possibility of a mistake or misfit.

The length of the tire is measured with approximate accuracy, and the holes C C and slotted holes D D made in it. It is then placed on the rim of the wheel, with the beveled ends overlapping, care being had that it is not too long, and the wedge-shaped bolts S S are inserted in the holes D D. Then the tightening or locking apparatus is applied by placing the bosses H H within the holes C C and fitting the slot K over the screw-bolt L.

The nut or washer O, which fits loosely over the sloping part of the bolt L, is then put in place, and the screw-wrench P applied to press it down upon the clamp G, with the effect of forcing the slotted end farther down the slope of the bolt L. The result is that the spread of the clamps is shortened, and, in the same measure, the ends of the tire are drawn together, and the tire tightened as much as may be desired.

When the tire has been made sufficiently tight, the bolts S S are drawn down and tightened by nuts T T, that hold it in place. The tightening apparatus is then removed, and other securing bolts or screws may, if necessary, be inserted through the holes C C.

It will readily be seen that this locking apparatus is also useful to enable the workman to get an exact measurement of the tire before setting.

Having thus described my invention, I claim as new and desire to secure by Letters Patent—

The combination, with the lap-jointed tire A B, having holes C and slots D, of the plates F G, having the hook H and slot I, the wedge-bolt L, attached to plate F and passing through hole K of the plate G, and the nut P, working against a washer, O, as and for the purpose specified.

DAVID FAIRBANKS.

Witnesses:
S. C. FOSTER,
F. E. DARLING.